United States Patent [19]

Torrington et al.

[11] 3,888,493

[45] June 10, 1975

[54] APPARATUS FOR INHIBITING A PLURALITY OF RECORDS FROM BEING DISPOSED ON A TURNTABLE

[75] Inventors: Leslie Albert Torrington; Frederick Roland Stave, both of Indianapolis, Ind.

[73] Assignee: RCA Corporation, New York, N.Y.

[22] Filed: Apr. 22, 1974

[21] Appl. No.: 462,769

[52] U.S. Cl. .............................. 274/1 R; 274/39 R

[51] Int. Cl. ......................... G11b 15/00; G11b 3/60

[58] Field of Search ................. 274/10 S, 1 R, 39 R

[56] References Cited

UNITED STATES PATENTS

| | | | |
|---|---|---|---|
| 2,556,421 | 6/1951 | Gee | 274/2 |
| 3,216,729 | 11/1965 | Babler | 274/10 S |

*Primary Examiner*—Harry N. Haroian
*Attorney, Agent, or Firm*—Eugene M. Whitacre; Stephen Siegel; William H. Meagher

[57] ABSTRACT

A disc type record player incorporates apparatus for preventing more than one record disc from being disposed in operative position on a turntable at any one time. Movable members associated with a turntable spindle are operatively repositioned in response to passing a first record disc over the spindle and onto the turntable. The repositioned members inhibit passage of a further record disc over the spindle.

Player operation is inhibited when a sensing means detects the presence of a further record on the spindle.

8 Claims, 3 Drawing Figures

APPARATUS FOR INHIBITING A PLURALITY OF RECORDS FROM BEING DISPOSED ON A TURNTABLE

This invention relates to disc type record player systems and more particularly to an arrangement for preventing the disposing of more than one record at one time in operative position on a turntable.

Many prior art arrangements exist in automatic audio record changer apparatus for selectively controlling the passage of a number of records onto a turntable. However, the present invention is directed to a different problem which exists in certain disc record players wherein only a single record is to be disposed in operative position and played on the turntable at any one time. Such a system, for example, is the video disc player described in a U.S. Patent Application in the name of Jon K. Clemens, Ser. No. 126,772, filed Mar. 22, 1971 now U.S. Pat. No. 3,842,194, issued Oct. 15, 1974. In the Clemens application, a video reproducing system is described which senses the capacitance between a stylus playback device and a disc record to reconstruct the video information embossed within a spiral groove on the disc record. The stylus may include a thin conductive element or electrode which is arranged to ride in the spiral groove of the record which is rotated at high speeds. In such systems, the video information is recorded in the form of geometric variations in the spiral groove on the surface of the disc record. The disc surface may include a conductive material covered with a thin coating of dielectric material. The stylus electrode cooperates with the conductive material and dielectric coating to form a capacitor. As the disc record is rotated, an edge of the conductive electrode, while riding in the disc groove, cooperates with the disc record to establish capacitive variations due to the geometrical variations in the spiral groove. Illustratively, (as described, for example, in the copending U.S. Patent Application of Stephen E. Hilliker, Ser. No. 295,854, filed on Oct. 10, 1972), the variable capacitor formed by the record and stylus serves as a variable element of a tuned circuit which also includes a transmission line formed by a conductive stylus support arm and an enclosing stylus arm housing of conductive material. The record side of the variable stylus-record capacitor is returned to the housing via the capacitance established between the conductive disc material and the conductive housing which overlies the disc during playback operations. As the record is rotated, the resultant stylus-record capacitive variations vary the resonant frequency of the tuned circuit, causing an RF signal applied to this tuned circuit to be amplitude modulated in accordance with recorded information.

In order to insure that capacitance variations between the stylus and disc record produce a resonant frequency variation of adequate magnitude, it is desirable to make the series connected capacitance established between the stylus arm housing and record surface as large as possible. The series capacitance may be made large by locating the stylus arm housing as close as possible to the surface of the disc record during playback operations. Hence, if the stylus arm housing is spaced close to the surface of the disc record, for example, within 50–150 mils, addition of a second disc record (75 mils thick) on top of a first disc record may undesirably cause contact of the stylus arm housing with the second record irreversibly damaging the second record. In addition, an attempt to play the top one of a plurality of such records may result in degraded playback performance. This, for example, may be due to a resultant alteration of geometry between the playback transducer or stylus and the information bearing grooves of the record.

To avoid these and other problems, an arrangement is disclosed herein for inhibiting the introduction of a second record into operable position on the turntable in the presence of a first such record. The arrangement is accomplished in a desirably simple and economic manner, without interference or disruption of the normal operating sequences of the record playback system.

Briefly, in accordance with the invention, there is provided an apparatus for preventing a plurality of records from being disposed about a spindle on a supporting turntable. The apparatus comprises first means having first and second record engaging portions. Means are provided for mounting the first means to the spindle for movement between first and second positions in response to movement of a record along the spindle. In a first position, the first record engaging portion is in the path of a record passed along said spindle with the second record engaging portion out of the record path. In the second position, the first record engaging portion is maintained out of the path by a first record disposed on the turntable. At the same time, the second record engaging surface is thereby disposed in the record path along the spindle, to prevent any further records from being passed along the spindle onto the turntable. In accordance with a further feature of the invention sensing means are incorporated with the disc player to sense the presence of a further disc record upon the spindle and inhibit player operation in response thereto.

The invention will be readily understood from the following discussion when read in conjunction with the drawing, in which.

Figure 1:
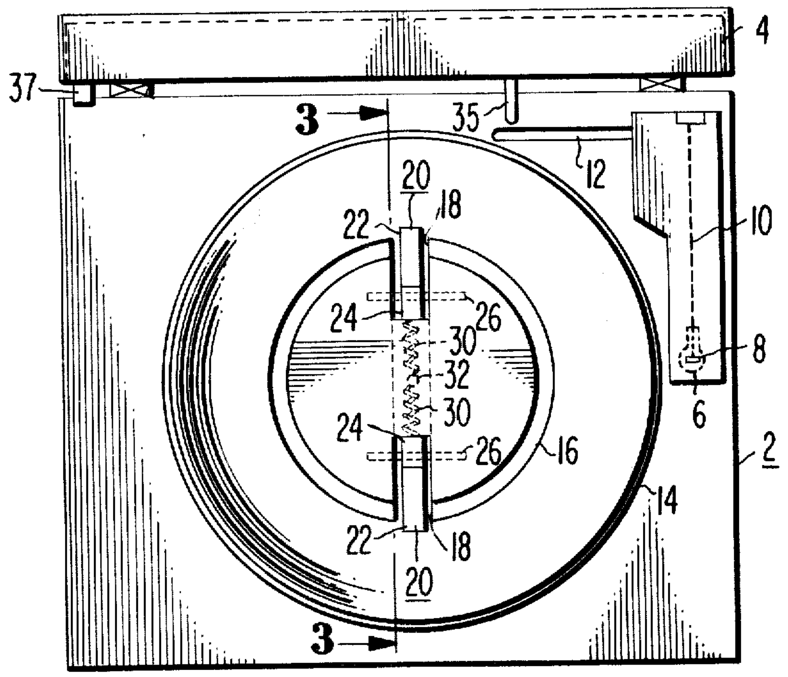
FIG. 1 is a plan view of a portion of a record player apparatus embodying the invention.
Figure 2:
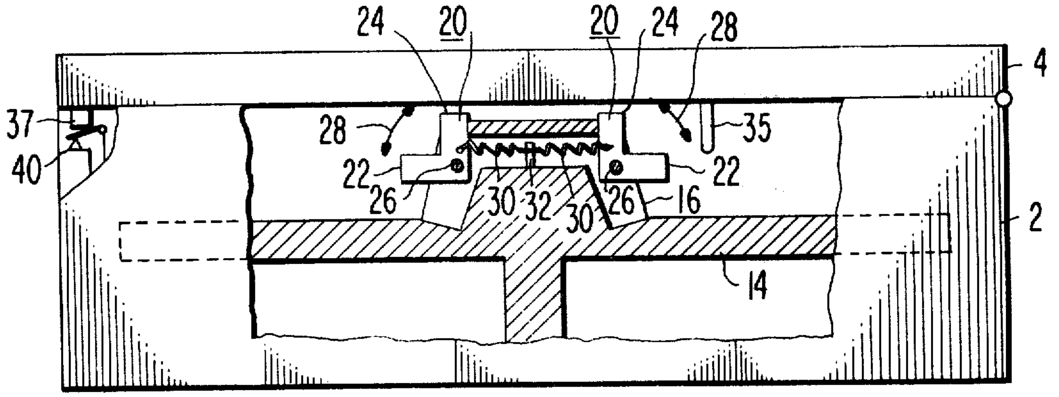
FIG. 2 is a side view partly in section for one operating position of the embodiment of FIG. 1.
Figure 3:
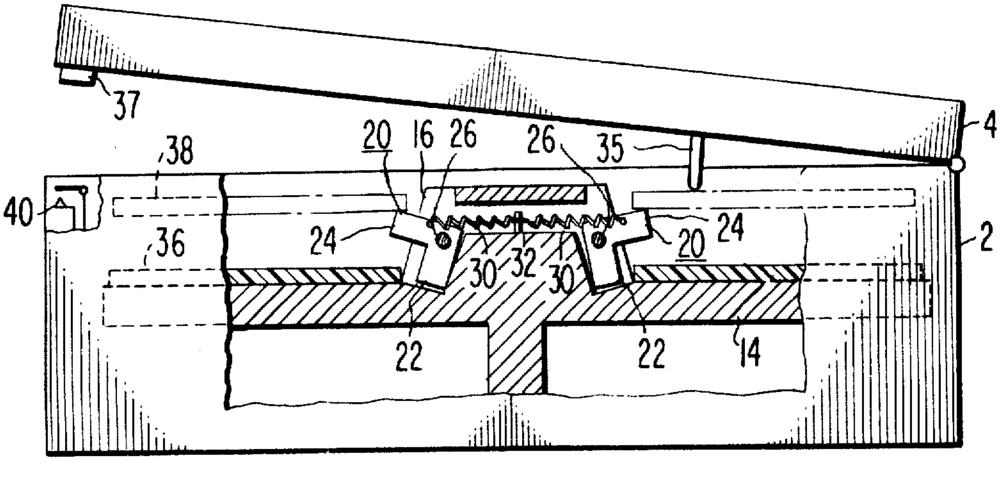
FIG. 3 is a side view partly in section of a further operating position of the embodiment of FIGS. 1 and 2.

FIGS. 1–3 show, in simplified form, a record playback system which is housed in an enclosure 2 having a hinged lid 4. The playback system includes an arm housing 6 in which are mounted a stylus transducer 8 at the end of a tracking arm 10. The arm housing 6 is mounted, by means not shown, for lateral movement in the direction of slot 12. This facilitates cooperation of the stylus transducer 8 with a record disposed on a turntable 14. The turntable 14 includes a tapered annular record centering spindle portion 16 which is arranged for rotation with the turntable 14.

The spindle member 16 has a pair of slots 18 communicating with the peripheral surface of the spindle member 16. Disposed in each of the slots 18 is a generally L-shaped member 20. The members 20 each have a pair of record engaging portions 22 and 24. The members 20 are mounted for pivotal movement through the slots 18 by means of pin members 26 disposed in the spindle member 16.

The pivotal mounting 26 facilitates rotational movement of the members 20 in the direction indicated by arrows 28 in FIG. 2. FIG. 2 shows the members 20 disposed in a first position in which the record engaging portion 24 is disposed within the slotted peripheral surface of the spindle member 16. In this first position, the record engaging portion 22 of member 20 extends out of the slot 18 to a point beyond the peripheral surface of the spindle member 16. The portion 22 is therefore disposed in the path of a record which is to be passed along the spindle member 16 for disposition on the turntable 14. The members 20 are urged into their first position by means of spring members 30 which have an end secured to a mounting lug 32 in the spindle member 16. It will be understood that other suitable arrangements may be utilized for this purpose, such as directly intercoupling the members 20 by a single spring member.

FIG. 3 shows a further operating position for the members 20. The members 20 are disposed in the position shown in FIG. 3 by virtue of a first record 36 being passed along the spindle 16 onto the turntable 14. In the position shown in FIG. 3, the record engaging portion 22 of member 20 is rotated and maintained in the slot 18 by the record 36. For this further position, the record engaging surface 24 extends out of the slotted peripheral surface of the record spindle 16 and is disposed to engage any further record which is attempted to be passed down along the spindle member 16 onto the turntable 14.

For purposes of explaining the operation of the arrangement, it will be assumed that initially there is no record present about the spindle 16 on the turntable 14. For this condition, the spring members position the members 20 in the position shown in FIG. 2. A record 36 is now introduced and passed along the periphery of the spindle 16. The record passed along the spindle engages the portion 22 of members 20. Further movement of the record toward the turntable 14 results in rotation of the members 20. Upon the record 36 becoming disposed on the turntable 14, the members 20 are disposed in the position shown in FIG. 3. The members 20 are maintained in this position by the presence of the record 36 on the turntable which is in engagement with the portion 22 of the members 20. As previously indicated for the position of members 20 in FIG. 3, the record engaging portion 24 is disposed in the record path along the spindle 16. As illustrated in FIG. 3 for this position of the members 20, the record engaging portion 24 is effective in inhibiting passage of a further record 38 along the spindle and onto the turntable 14. To allow a different record to be disposed on the turntable 14, the first record 36 is removed by upward passage over the spindle member 16. The upward movement of the record 36 permits rotation of the members 20 and under the influence of spring members 30, the members 20 are again disposed in the position shown in FIG. 2 which allows a record to be passed along the spindle 16.

It may not be desirable to operate the playback system with a further record disposed as shown in FIG. 3. To prevent operation of the playback system for such condition, a record sensing interlock arrangement is provided. This arrangement includes a protruding member 35 which is secured to the hinged lid 4 of the enclosure 2. The lid 4 also includes an actuating member 37. The actuating member 37 is arranged to cooperate with a switch means 40 when the lid is in the fully closed position. Switch 40 is interconnected with control circuitry, not shown, which controls energization of the playback system. That is, the switch 40 when disposed in its closed contact position as shown in FIG. 2 allows normal operation of the playback system. For the open contact position of switch means 40, as shown in FIG. 3, operation of the system including rotation of the turntable is prevented. Thus, as shown in FIG. 3, where the member 35 engages a record disposed in the position of record 38 of FIG. 3, the lid member 4 is prevented from completely closing. For this condition, the actuating member 37 is unable to effect closure of the contacts of switch 40, thus inhibiting operation of the playback system. If, however, the record 38 is removed from the spindle 16 or for the condition where no record or only a record 36 is disposed on the turntable 14, the lid 4 may be closed without obstruction of the member 35, as shown in FIG. 2. For this condition as shown in FIG. 2, the actuating member 37 causes closure of the contacts of the switch 40, thereby enabling the control circuitry for normal operation of the playback system.

What is claimed is:

1. Apparatus for preventing a plurality of records from being disposed about a spindle on a supporting turntable, comprising:

record engaging means having first and second record engaging portions;

means mounting said record engaging means to said spindle for movement between first and second positions in response to movement of a record along said spindle;

in said first position said first record engaging portion being in the path of a record passed along said spindle with said second record engaging portion out of said record path;

in said second position said first record engaging portion being maintained out of said path by a first record disposed on said turntable with said second record engaging portion thereby disposed in the path of a record along said spindle to prevent any further records from being passed along said spindle onto said turntable.

2. The apparatus according to claim 1 wherein said spindle has a slot therein communicating with the peripheral surface thereof, said record engaging means being rotatably mounted in said slot in a manner to allow both said first and second record engaging portions to move into and out of said slot in response to a record being passed along said spindle, said record engaging portions further arranged to simultaneously engage a record disposed on said turntable and a further record spaced therefrom along said spindle.

3. The apparatus according to claim 2 wherein said record engaging means comprises a generally L-shaped member having substantially orthogonal record engaging surfaces.

4. The apparatus according to claim 2 including a record playback system, and sensing means arranged for inhibiting operation of said playback system in the presence of said further record on the spindle of said turntable.

5. The apparatus of claim 4 wherein:

said turntable is mounted to a housing having a lid pivotally connected to said housing for providing movement between a first turntable-enclosing position and a second open position; and wherein said sensing means comprises switching means responsive to the position of said lid for inhibiting player operation when said lid is in said second open position and permitting player operation when said lid is in said first turntable-enclosing position, and a probing member fastened to said lid for inhibiting closure of said lid in the presence of a further disc record upon the spindle of said turntable.

6. Apparatus for preventing further central apertured disc type records from being disposed on a first record already present on a turntable comprising:

a spindle having a surface portion defining a periphery for receiving a record in operable position on said turntable;

at least one record control member having first and second generally orthogonal record engaging portions;

means for mounting said member to said spindle for movement between a first position in which said first record engaging portion is within said spindle periphery and a further position in which said first engaging portion extends beyond said periphery; and means for urging said member to said first position in the absence of a record disposed about said spindle, with said member being maintained in said second position in the presence of a record on said turntable by engagement of said second record engaging portion with said record.

7. The apparatus according to claim 6 wherein said spindle includes a slot therein communicating with said record receiving periphery, and wherein said mounting means permits rotation of said member through said slot.

8. The apparatus according to claim 6 including a plurality of said record control members disposed in spaced relation about said spindle, and wherein said urging means includes spring means intercoupling a portion of each of said plurality of record control members with said spindle for urging said control members to their first position.

* * * * *